P. S. HERRING.
PUMP.
APPLICATION FILED APR. 13, 1917.

1,406,859.

Patented Feb. 14, 1922.

Witness:
R. L. Jarrington

Inventor
Paul S. Herring.
By Glenn S. Noble
Atty.

UNITED STATES PATENT OFFICE.

PAUL S. HERRING, OF CHICAGO, ILLINOIS.

PUMP.

1,406,859.

Specification of Letters Patent. Patented Feb. 14, 1922.

Application filed April 13, 1917. Serial No. 161,871.

*To all whom it may concern:*

Be it known that I, PAUL S. HERRING, a citizen of the United States, residing at Chicago, in the county of Cook and State of Illinois, have invented certain new and useful Improvements in Pumps, of which the following is a specification.

This invention relates to air pumps and is particularly adapted for use in connection with automobiles to furnish air for inflating the tires.

The objects of the present invention are to provide an air pump of exceedingly simple construction so that it can be cheaply made; to provide a pump of this character which will be particularly efficient and durable in operation; to provide means for locking the pump piston out of operative position; and to provide such other advantages as will appear more fully from the following description.

Figure 1:
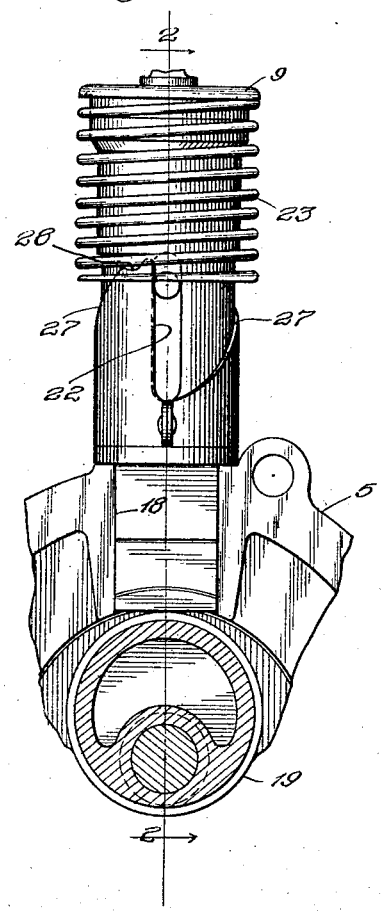
Fig. 1 is an elevation showing the pump as applied to an automobile engine.
Figure 2:
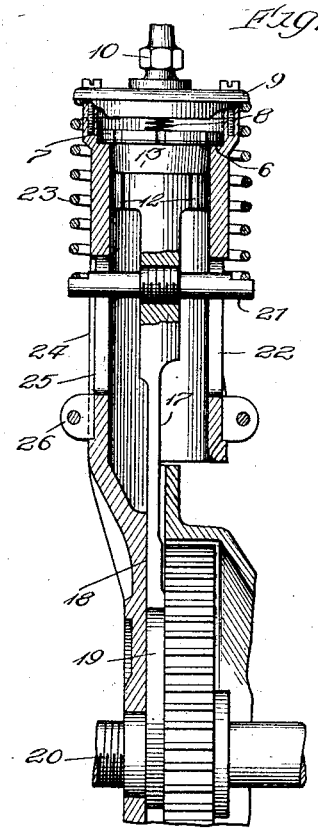
Fig. 2 is a sectional view taken on the line 2—2 of Fig. 1.
Figure 3:
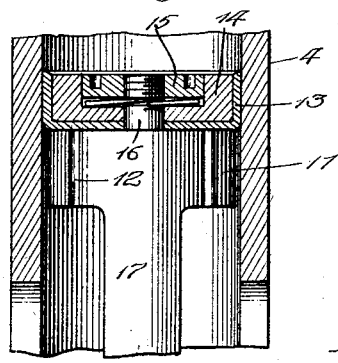
Fig. 3 is an enlarged detail of the piston and valve.

As illustrated in these drawings, 4 represents the pump cylinder which may be formed integrally with a base or support 5. This base or support, in some instances, may comprise a portion of the engine casing when the pump is attached to an automobile engine. The upper end of the cylinder 4 is slightly enlarged to form a seat 6 for the outlet valve 7. This outlet valve comprises a flat plate having grooves in the periphery thereof, so that the air will pass freely around the same. It is pressed down to closed position by means of a spring 8. The upper end of the cylinder 4 is provided with a head or cover 9 having any suitable type of connection 10, for connecting the tubing for conveying the air to the tires.

The cylinder 4 is provided with a piston 11 which moves freely therein, and which has grooves 12 in the periphery thereof to allow the air to pass the same. This piston is provided with any suitable form of piston valve, the one shown comprising a leather cup or washer 13 which is held in position by means of a disc 14 and nut 15, the latter engaging with a threaded stem 16 extending upwardly from the piston 11. It will be seen that this entire structure comprises a piston valve, the portion 11 being primarily a guide for the valve proper.

A piston rod 17 extends down from the piston 11 and its lower end fits in a bearing 18 in the base or support 5. The lower end of the rod is adapted to engage with a cam 19 on a driving shaft 20. This shaft may be driven from any suitable source of power and may, for instance, be the cam shaft of an engine.

The piston rod 17 has a cross head or guide rod 21 which extends out through slots 22 in the sides of the cylinder. A coiled compression spring 23 engages with the projecting ends of the cross head 21 and with the outwardly extending portion of the cover or head 9, and tends to urge the piston downwardly.

A rotatable sleeve 24 fits within a circumferential recess 25 around the lower end of the cylinder 4, and is provided with projecting ears 26, whereby it may be readily turned. The upper end of this sleeve is made in the form of two semi-circular cams 27 which engage with the ends of the cross head 21, and notches or recesses 28 are provided at the upper ends of these cams so that when the ends of the cross head engage with these notches, the cross head and connected parts will be held in raised position.

When the pump is to be operated, the sleeve 24 is turned to release the cross head or guide rod 21 which permits the spring 23 to urge the piston rod 17 down against the cam 19; then, as the cam is driven, the piston will be reciprocated and the air will be forced out through the connection 10. When the pumping is completed, the sleeve 27 is again turned to raise the cross head or guide rod 21 and hold the parts out of operative position.

It will be seen from the above description and the accompanying drawings that I provide an exceedingly simple form of pump which may be readily assembled, and an exceptionally large and flexible spring may be used on account of having the same surround the cylinder.

Various changes in the details of the construction may be made without departing from my invention, therefore, I do not wish to limit myself further than is set forth in the following claims in which I claim:

1. In an air pump, the combination of a cylinder having slots in the side thereof, a piston, a piston rod, a pin engaging with said rod and extending out through said slots, a compression spring arranged around the outer circumference of the cylinder and engaging with said pin for moving the piston in one direction, and a cam sleeve for moving the pin against the pressure of the spring and locking it in raised position.

2. An air pump comprising a cylinder having guide ways in the side thereof, a piston in said cylinder, a guide rod for said piston extending out through said guide ways, a spring surrounding said cylinder and engaging with the ends of said guide rod to move the piston in one direction, a piston rod, a cam for moving the rod against the tension of the spring, and a rotatable sleeve adapted to engage with said guide rod to hold the piston rod out of engagement with said cam.

3. An air pump comprising a cylinder having slots in the side thereof and having an integrally formed bearing at one end, a piston, a piston rod engaging with said bearing, a cam coacting with said piston rod, a guide connected with said piston rod and extending out through said slots, a spring surrounding said cylinder with one end engaging with said guide, a head for said cylinder extending outwardly to engage with said spring, a rotatable sleeve fitting in a recess in the outer surface of the cylinder, said sleeve having cams adapted to engage with the ends of said guide and having notches for receiving the ends of the guide to hold the parts out of operative position.

4. In an air pump, the combination of a casing having a cylinder, a head for said cylinder projecting beyond the outer circumference thereof, a piston co-acting with said cylinder, a stem projecting from said piston, said casing being provided at the opposite end with a guide-way for said stem, and also having guide-ways in the sides thereof, a cross piece extending from said stem through said last named guide-ways, a rotatable member surrounding said casing and adapted to engage with the cross piece to lock the piston in raised position, a spring arranged outside of the cylinder between the head and cross member for moving the piston in one direction, and means for moving the piston in the opposite direction.

PAUL S. HERRING.